United States Patent Office 3,516,490
Patented June 23, 1970

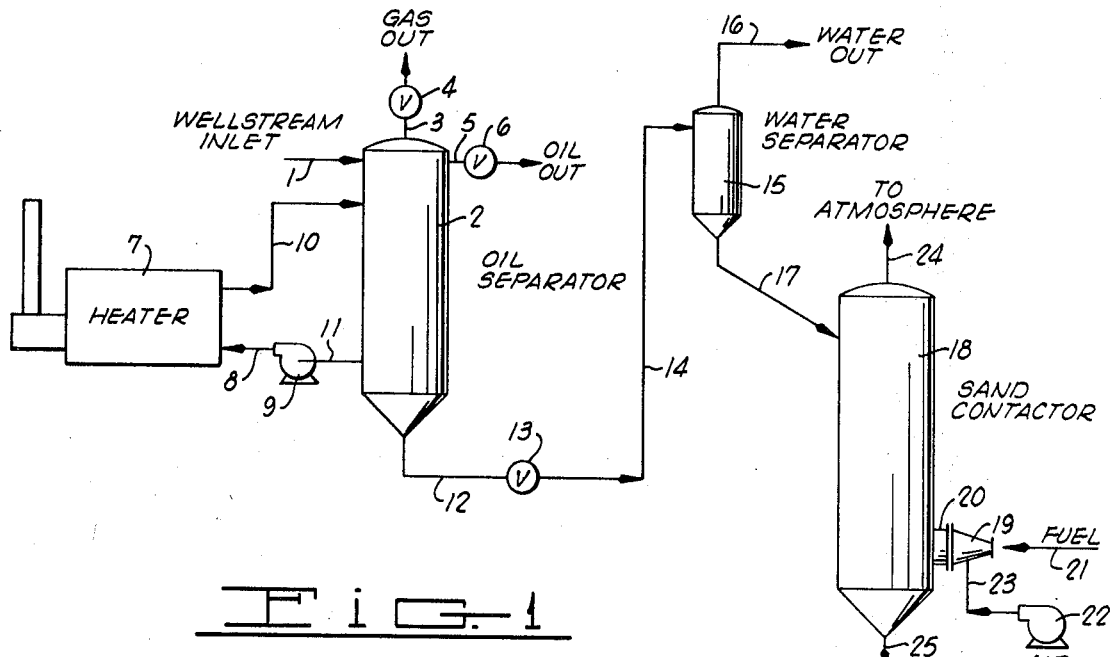
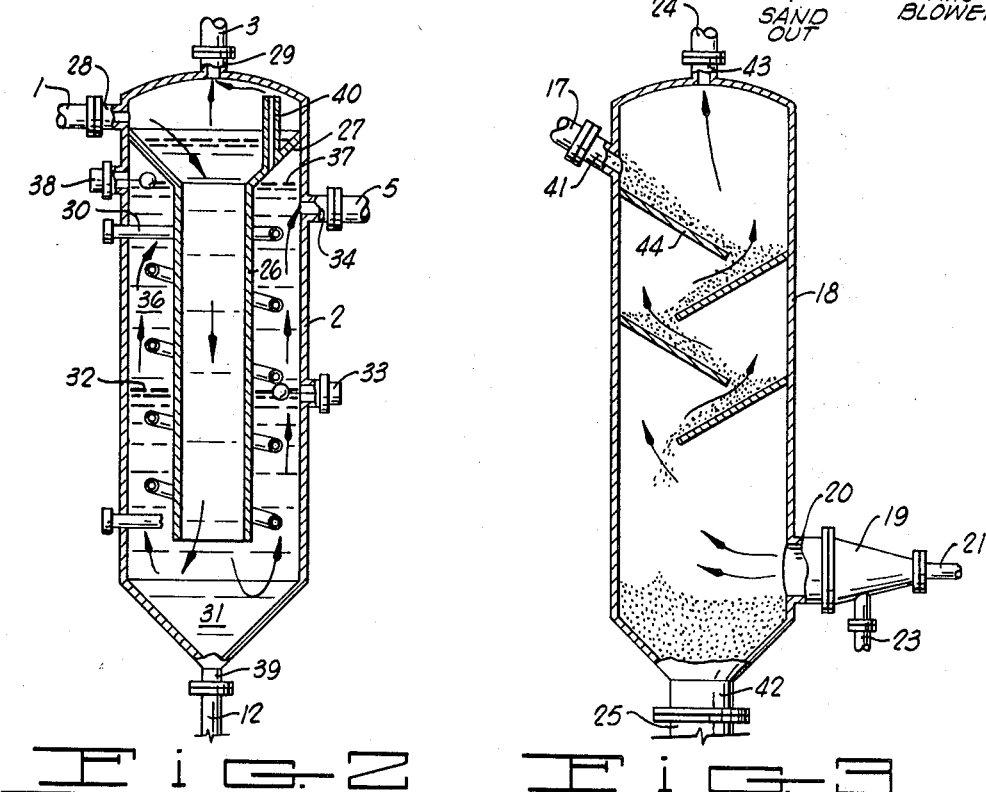

3,516,490
METHOD AND APPARATUS FOR PRODUCING AN OFF-SHORE WELL
Charles E. Smalling, Oklahoma City, Okla., and Otis J. Waguespack, Metairie, La., assignors to Black, Sivalls & Bryson, Inc., Kansas City, Mo., a corporation of Delaware
Filed Mar. 12, 1969, Ser. No. 835,829
Int. Cl. C10g *33/00;* E21b *43/01*
U.S. Cl. 166—.5                                           7 Claims

ABSTRACT OF THE DISCLOSURE

A method and apparatus for producing a well surrounded by a body of water wherein the well stream includes gas, water, oil, oil-water emulsion and oil-coated sand. The gas, oil and a portion of the water are separated from the well stream to form a slurry of water and oil-coated sand. The slurry is then contacted by hot gases to carbonize the oil on the sand so that the sand may be disposed of directly into the body of water surrounding the well without causing pollution thereof.

BACKGROUND OF THE INVENTION

Field of the invention

The present invention relates generally to a method and apparatus for producing a well, and more particularly, but not by way of limitation, to a method and apparatus for producing a well surrounded by a body of water wherein the well stream includes oil-coated sand.

Description of the prior art

Many various methods and apparatus for producing wells have been developed. However, in recent years many wells have been drilled in off-shore locations, and due to their distance from shore it is necessary to produce them with equipment located on platforms at or near the well site. Commonly, the gas, oil and water contained in such well streams are separated at the platform, with the water being disposed of in the body of water surrounding the platform and the gas and oil being conducted to the shore by separate pipe lines where they are further processed.

A problem with these prior methods and apparatus for producing wells arises where the well stream to be produced is surrounded by a body of water and contains sand. While the sand so produced can be readily separated from the gas, oil, water and other components in the well stream, an oil coating will remain on the sand. Thus, if the sand is disposed of in the body of water surrounding the platform, pollution of the body of water will result. Attempts have been made to convey the oil-coated sand produced in such wells to shore where it can be processed further or disposed of, but where the well site and platform is a considerable distance from the shore, this procedure becomes economically impractical.

SUMMARY OF THE INVENTION

The present invention relates to a method and apparatus for producing a well surrounded by water wherein the well stream includes gas, oil, water and oil-coated sand, which comprises separating the gas from said well stream, separating the oil from the well stream, separating a portion of the water from the well stream so that a slurry of water and oil-coated sand remains, contacting said remaining slurry of water and oil-coated sand with hot inert gases so that said oil on said oil-coated sand is carbonized, and disposing of said carbonized sand in said body of water.

It is, therefore, a general object of the present invention to provide a method and apparatus for producing a well.

A further object of the present invention is the provision of a method and apparatus for economically producing a well surrounded by a body of water wherein the well stream includes oil-coated sand.

It is still a further object of the present invention to provide a method and apparatus for producing a well surrounded by a body of water wherein the well stream includes oil-coated sand and wherein the sand may be separated from the well stream and disposed of in the body of water without causing polution thereof.

Other objects and advantages of the invention will be evident from the following detailed description when read in conjunction with the accompanying drawings which illustrate the invention.

BRIEF DESCRIPTION OF THE DRAWINGS

FIG. 1 illustrates, in schematic form, apparatus for carrying out the method of this invention, FIG. 2 is a vertical cross-sectional view of the oil separator of FIG. 1, and FIG. 3 is a vertical cross-sectional view of the sand contactor of FIG. 1.

DESCRIPTION OF THE PREFERRED EMBODIMENT

Referring now to the drawings, and particularly to FIG. 1, apparatus for carrying out the method of the present invention is illustrated. In an off-shore installation the apparatus shown is mounted on an off-shore platform (not shown) which is located at or near the well site. The well stream produced may be from one well or a combined stream originating from a number of wells.

Conduit 1 leads the well stream to be produced, which may include gas, water, oil, oil-water emulsion and oil-coated sand, to separator 2. Gas in the well stream is separated from the liquids and solids in the well stream in the top portion of separator 2 and is conducted out of separator 2 through conduit 3 and valve 4. Valve 4 may be any conventional back pressure control valve which will function to maintain a desired pressure in separator 2. Normally only a high enough pressure to drive the well stream being produced through separator 2 and its related piping is maintained on separator 2. This pressure can vary from about 25 p.s.i.g. to 125 p.s.i.g.

While within separator 2 oil is separated from the well stream and removed through conduit 5 and valve 6. valve 6 may be any conventional control valve which will function in association with a level controller (described hereinbelow) to maintain a desired oil level in separator 2. The oil thus separated from the well stream is conducted by conduit 5 to an area of further processing on the platform, or to a pipe line for transferring it to storage or further processing facilities on shore. Heater 7 may be a salt bath or other conventional type of heater for providing heat to a closed heating medium circuit. The heating medium used may be any commercially available heating oil such as Dowtherm manufactured and sold by Dow Chemical Company or Mobiltherm manufactured and sold by Mobil Oil Company. The heating oil is pumped through conduit 8 by pump 9 through conventional heating coils in heater 7, and into conduit 10. From conduit 10 the heating oil passes through a heating coil disposed within separator 2 and back to pump 9 through conduit 11 thereby imparting heat to the well stream within separator 2. This heat has the effect of breaking any oil-water emulsion contained in the well stream and facilitates the separation of oil from the well stream. The heating coil and other internal components disposed within separator 2 will be described in detail hereinbelow.

The well stream remaining after the gas and oil have been removed, i.e., water and oil-coated sand, accumulate in the lower portion of separator 2 from where they enter conduit 12 and valve 13. Valve 13 may be any conventional control valve which will function in association with a level controller (which will be further described herein) to maintain a desired level in separator 2. From valve 13 the water and oil-coated sand travel through conduit 14 into separator 15. Separator 15 may be any conventional water-sand separator which will separate a water-sand mixture into a clean water stream and a slurry of sand. Such separators generally contain apparatus which will impart a centrifugal force to the stream being processed thereby causing the heavy sand to be moved to the bottom of the separator and clean water to travel towards the top of the separator. Such separators are commercially available in the United States from a number of suppliers. No further detailed description of separator 15 is given since any conventional sand separator may be used to carry out the method of this invention.

Clean water separated from the water and oil-coated sand entering separator 15 is removed from separator 15 through conduit 16. Conduit 16 may lead the separated water to an area of further use on the platform, or to the body of water surrounding the platform thereby disposing of it. The oil-coated sand and water slurry accumulates in the bottom portion of separator 15 and passes into conduit 17 from where it is conducted by gravity flow to sand contactor 18. While within sand contactor 18 the slurry of water and oil-coated sand is contacted by hot combustion gases passing upwardly through sand contactor 18. The hot combustion gases are generated by burner 19 connected to sand contactor 18 by conduit 20. Burner 19 may be any conventional short flame high intensity combustion burner capable of producing a high velocity jet of inert combustion gases. An example of one such burner suitable for use in this invention is disclosed in U.S. Pat. No. 3,265,113 dated Aug. 9, 1966. Fuel is supplied to burner 19 through conduit 21, and air is supplied to burner 19 by air blower 22 through conduit 23. The inert combustion gases produced by burner 19 pass into sand contactor 18 and travel upwardly therein intimately contacting and heating the slurry of water and oil-coated sand passing downwardly in contactor 18. Due to this heating process within contactor 18 water contained in the slurry is vaporized and passes out of sand contactor 18 with the combustion gases through conduit 24, from where the gases are vented to the atmosphere. The oil-coated sand passing downwardly in contactor 18 is also heated and as a result the oil on the sand is carbonized. The carbonized sand accumulates in the bottom portion of sand contactor 18 and passes out of contactor 18 by gravity flow through conduit 25. Conduit 25 may extend directly into the body of water surrounding the platform thereby providing a seal on conduit 25 which will prevent combustion gases from passing through it with the carbonized sand.

Referring now to FIG. 2 a cross-sectional view of oil separator 2 is shown. Disposed within separator 2 is an elongated conduit or pipe 26 which is welded to a cone-shaped baffle 27. The baffle 27 is in turn welded to the walls of separator 2 around the entire inside periphery of separator 2. The well stream to be produced enters separator 2 through conduit 1 and through nozzle 28 above baffle 27. Gas contained in the well stream rises to the top portion of separator 2 and passes out of separator 2 through nozzle 29 and conduit 3. The remaining well stream, which may include water, oil, oil-water emulsion and oil-coated sand passes downwardly over baffle 27 and through pipe 26. Disposed within separator 2 and around pipe 26 is a heating coil 30. Hot oil or other heating medium, described above, is pumped through heating coil 30, thereby imparting heat to the fluids surrounding it. Some of this heat is transferred through the walls of pipe 26 thereby preheating the well stream passing downwardly within pipe 26. The preheated well stream passes out of the end of pipe 26 and then travels upwardly in the annulus between the walls of separator 2 and pipe 26 where further heat is imparted to it by heating coil 30. Due to this heating of the well stream, oil-water emulsion contained in the well stream is broken and the oil and water separated. Additionally, due to the difference in specific gravity of oil, water and sand the water and sand accumulate in the bottom portion of separator 2 and the lighter oil passes upwardly through the water and sand towards the top portion of separator 2. A body of water 31 is maintained in the bottom portion of separator 2 with an oil-water interface 32 positioned at a point above the lower end of pipe 26. Oil-water interface 32 may be maintained at the desired point by a conventional float operated level controller 33 which automatically opens and closes valve 13. Level controller 33 may be any conventional pneumatic or electric level control apparatus and no further detailed description of it is given herein. Oil passing through the body of water 31 travels upwardly to the top portion of separator 2 and passes out of separator 2 through nozzle 34 into conduit 5. A body of oil 36 is maintained in the top portion of separator 2 with an interface 37 positioned at a point above nozzle 34. Oil level 37 may be maintained at the desired position by level controller 38 which automatically opens and closes valve 6. Level controller 38 may be any conventional pneumatic or electric level control apparatus and no further detailed description of it is given herein. Due to the heat imparted to the oil passing upwardly in separator 2 vaporization of some of the lighter ends contained in the oil will take place. These vapors accumulate in the annulus between baffle 27 and the walls of separator 2 and pass upwardly through pipe 40 into the top portion of separator 2 from where they combine with gases separating from the well stream being produced and pass out of separator 2 through nozzle 29 into conduit 3. Water and oil-coated sand accumulating in the bottom portion of separator 2 pass out of separator 2 through nozzle 39 into conduit 12.

Referring now to FIG. 3 sand contactor 18 is shown in cross-section. A slurry of water and oil-coated sand from sand separator 15 enters and contactor 18 through conduit 17 and nozzle 41. The slurry travels by gravity downwardly in contactor 18 over baffles 44. Hot inert combustion gases produced in burner 19 pass through conduit 20 and into contactor 18. These hot gases pass upwardly through contactor 18 thereby intimately contacting the slurry of water and oil coated sand passing downwardly therein. Heat is imparted to the water and sand thereby vaporizing the water which passes upwardly with the combustion gases to the top of contactor 18, through nozzle 43 and into conduit 24. Once the water is vaporized the oil-coated sand is further heated by the inert combustion gases causing the oil on the sand to be carbonized. The thus carbonized sand falls to the bottom portion of contactor 18 and travels by gravity through nozzle 42 into conduit 25.

OPERATION

In operation, gas and oil are separated from the well stream being produced which may include gas, oil, water, oil-water emulsion and oil-coated sand, thereby allowing their further processing at the platform or their transfer to shore for storage or further processing. A portion of the water is then separated from the well stream which may be readily disposed of in the body of water surrounding the platform or used for other purposes on the platform. The remaining slurry of water and oil-coated sand is contacted by hot inert combustion gases which bring about the vaporization and removal of the water from the oil-coated sand and carbonization of the oil on the sand. The carbonized sand is disposed of directly into the body of water surrounding the platform without pollution of the water resulting.

It should be noted that if the well stream being produced contains a large volume of gas, it may be desirable to separate the gas from the well stream in a conventional separator upstream of the apparatus described herein. Also, if the well stream to be produced contains no oil-water emulsion, the means for heating the well stream in separator 2 may be omitted. Additionally, if a separate source of hot inert gases is available on the platform, such as exhaust gases from compressors, turbines or the like, burner 19 may be omitted and the exhaust gases substituted as a source of hot inert gases.

The present invention therefore is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention disclosed herein.

What is claimed is:

1. A method of producing a well surrounded by a body of water wherein the well stream includes gas, oil, water and oil-coated sand, comprising:
   separating said gas from said well stream;
   separating said oil from said well stream;
   separating a portion of said water from said well stream so that a slurry of water and said oil-coated sand remains;
   contacting said remaining slurry of water and oil-coated sand with hot gases so that said oil on said oil-coated sand is carbonized; and
   disposing of said carbonized sand in said body of water.

2. The method of claim 1 which is further characterized to include the step of disposing of said separated portion of said water in said body of water.

3. A method of producing a well surrounded by a body of water wherein the well stream includes gas, oil, water, oil-water emulsion and oil-coated sand, comprising:
   separating said gas from said well stream;
   heating said well stream so that said oil-water emulsion is broken and oil is separated from said water and oil-coated sand;
   removing said separated oil from said well stream;
   separating a position of said water from said well stream so that a slurry of water and oil-coated sand remains;
   contacting said remaining slurry of water and oil-coated sand with hot gases so that said oil on said oil-coated sand is carbonized; and
   disposing of said carbonized sand in said body of water.

4. The method of claim 3 which is further characterized to include the step of disposing of said separated portion of said water in said body of water.

5. Apparatus for producing a well surrounded by a body of water wherein the well stream includes gas, oil, water and oil-coated sand, comprising:
   a first separator for separating said oil and gas from said well stream;
   a second separator for separating a portion of said water from said well stream so that a slurry of water and oil-coated sand remains;
   connection means between said first separator and said second separator for conducting said well stream therebetween;
   a contactor for intimately contacting said remaining slurry of water and oil-coated sand with hot gases so that oil on said oil-coated sand is carbonized;
   connection means between said second separator and said contactor for conducting said slurry therebetween;
   means for generating hot gases connected to said contactor; and
   means for conducting said carbonized sand from said contactor into said body of water.

6. The apparatus of claim 5 which is further characterized to include means for conducting said separated portion of said water into said body of water.

7. The apparatus of claim 5 wherein said first separator includes means for heating said well stream.

References Cited
UNITED STATES PATENTS 3,057,404  10/1962  Bergstrom _____ 166—267

ERNEST R. PURSER, Primary Examiner

I. A. CALVERT, Assistant Examiner

U.S. Cl. X.R.

166—267; 208—187